Figure 1:
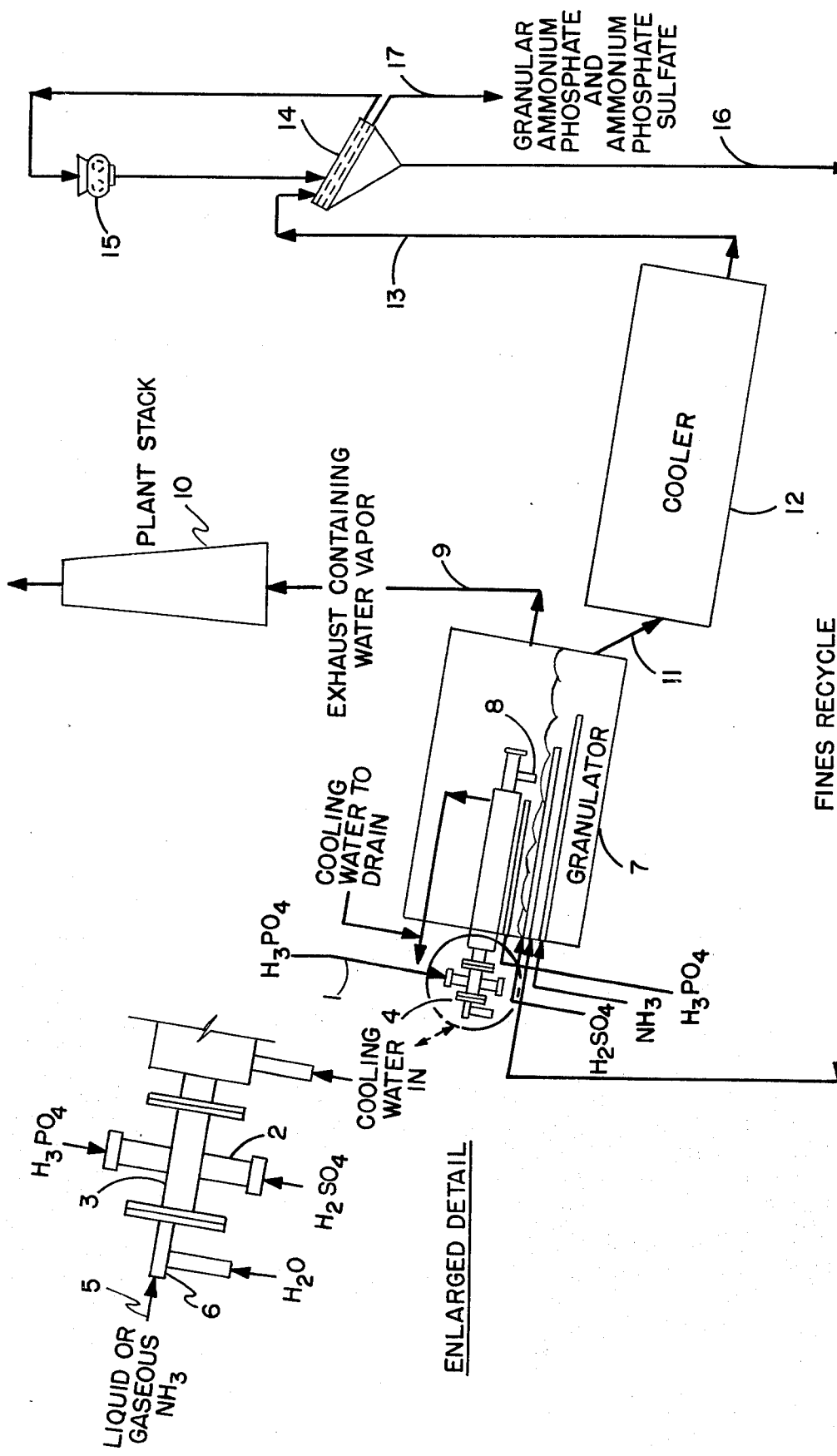

United States Patent [19]

Achorn et al.

[11] 3,954,942
[45] May 4, 1976

[54] GRANULAR AMMONIUM PHOSPHATE SULFATE AND MONOAMMONIUM PHOSPHATE USING COMMON PIPE-CROSS-TYPE REACTOR

[75] Inventors: Frank P. Achorn; Josiah S. Lewis, Jr., both of Florence, Ala.

[73] Assignee: Tennessee Valley Authority, Muscle Shoals, Ala.

[22] Filed: Apr. 24, 1975

[21] Appl. No.: 571,424

Related U.S. Application Data

[63] Continuation-in-part of Ser. No. 506,225, Sept. 16, 1974.

[52] U.S. Cl. ................................. 423/313; 71/43
[51] Int. Cl.² ................... C01B 15/16; C01B 25/26
[58] Field of Search ............................... 71/43; 423/309–313

[56] References Cited
UNITED STATES PATENTS

| | | | |
|---|---|---|---|
| 2,729,554 | 1/1956 | Nielsson | 71/43 |
| 2,902,342 | 9/1959 | Kerley | 423/310 |
| 3,310,371 | 3/1967 | Lutz | 423/310 |
| 3,313,614 | 4/1967 | Sharples et al. | 71/43 |
| 3,418,255 | 12/1968 | Brown et al. | 71/43 |

Primary Examiner—Oscar R. Vertiz
Assistant Examiner—Gregory A. Heller
Attorney, Agent, or Firm—Robert A. Petrusek

[57] ABSTRACT

A process for the production of fertilizers from phosphoric and sulfuric acids, liquid anhydrous ammonia, and water. The ammonia is premixed with a small quantity of water in a common pipe; the resulting mixture is subsequently mixed downstream of said common pipe with the acids introduced to the pipe through a pipe cross. The acids and aqua ammonia react in the pipe cross and extension of the pipe beyond the cross. Overall length of the pipe reactor is 7 feet and it is cooled by a water jacket. In another variation of the process, the cooling water jacket is not used and the reaction tube is made of either Hastelloy C metal or Teflon-lined mild steel pipe. Slurry from the reactor is granulated with recycle fines, additional phosphoric and sulfuric acids, and ammonia in a rotary drum. Product from the granulator is cooled and screened for product size removal. Equipment is uncomplicated, easy to operate, and inexpensive. Ammonium phosphate sulfate grades such as 6-24-24, 12-12-12, 8-32-16, 8-22-11 and monoammonium phosphate 12-48-0 have been produced with this process.

11 Claims, 11 Drawing Figures

PIPE-CROSS REACTOR WITH AMMONIA VAPORIZER

PIPE-CROSS REACTOR WITH HOT AQUA AMMONIA

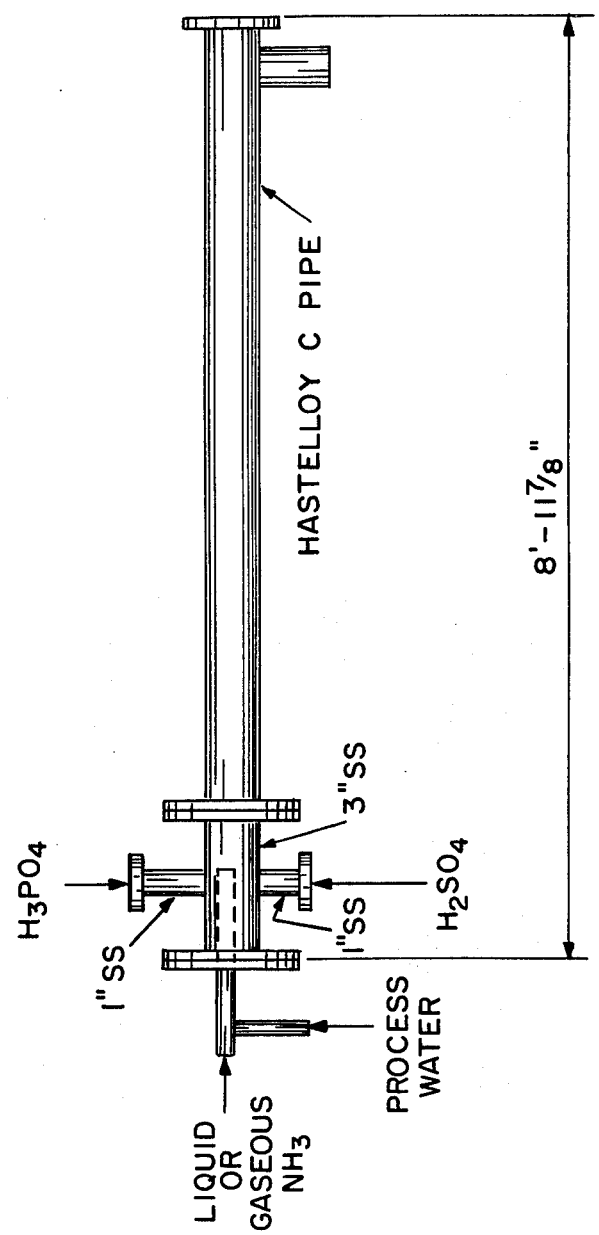

GRANULAR AMMONIUM PHOSPHATE SULFATE AND MONOAMMONIUM PHOSPHATE USING COMMON PIPE-CROSS-TYPE REACTOR

The invention herein described may be manufactured and used by or for the Government for governmental purposes without the payment to us of any royalty therefor.

This application is a continuation-in-part of copending application Ser. No. 506,225, filed Sept. 16, 1974, for GRANULAR AMMONIUM PHOSPHATE SULFATE USING COMMON PIPE-CROSS-TYPE REACTOR, now Defensive Publication T 942,006, issued January 6, 1976.

Our invention relates to an improvement in the production of fertilizers from phosphoric acid, sulfuric acid, and ammonia, and more particularly it relates to improved processes for the production of high-analysis granular ammonium phosphates and ammonium phosphate sulfates.

Ammonium phosphate sulfates, as well as monoammonium, and diammonium phosphates are effective for fertilizer use because of their favorable physical properties, high concentration of plant foods, and because they provide an economical method of fixing ammonia in a solid form. These fertilizer materials are attractive because they are multi-nutrient materials and greenhouse tests have shown that these multi-nutrient materials are very effective sources of plant nutrients-nitrogen, phosphorus pentoxide, and, in the instance of ammonium phosphate sulfates, sulfur. A review of agronomic data shows ammonium phosphate sulfate, monoammonium phosphate, and diammonium phosphate are particularly suited for use in alkaline soils and also on acid soils when their residual acidity is neutralized with limestone.

Monoammonium phosphate has been produced commercially in the United States, Canada, and European countries, such as England and Spain, from ammonia and wet-process phosphoric acid by processes that were developed by the Imperial Chemical Industries of England and the Scottish Agricultural Industries of Scotland; however, products produced by both of these processes are nongranular and are dusty and, for this reason, are impractical for use as a direct application material or for the production of bulk blends. Products produced by our process will be dust free and of such particle size distribution that they are well suited for the production of bulk blends and direct application.

In U.S. Pat. No. 3,153,574, Achorn et al, there is disclosed a process for the manufacture of diammonium phosphate from wet-process phosphoric acid and ammonia; however, in this process a large preneutralizer is required. A principal advantage of our process is that the requirement for this large preneutralizer has been eliminated.

In U.S. Pat. No. 2,902,342, Kerley et al., a process is described for the production of ammonium phosphate sulfate. However, In Kerley's process, both a complicated acid preparation and a first ammoniation step are required. The first ammoniation step is quite similar to the preneutralization step described by Achorn et al., supra. A primary objective of our invention is to eliminate these extra steps and the complicated and expensive equipment. We have now discovered that this can be accomplished by specially designing a pipe-cross reactor with a pipe extension used to vaporize the liquid anhydrous ammonia used in our process.

Prior-art arrangements in the processes of the above-mentioned type have proved to be operative; however, such processes require the expenditure of substantial amounts of capital for such relatively expensive equipment as large preneutralization vessels and acid preparation tanks. In addition, the processes shown in the prior art produced only ammonium phosphates or ammonium phosphate sulfates. In our process, all three materials (diammonium phosphate, monoammonium phosphate, and ammonium phosphate sulfate) can be produced.

Our invention is directed to an improved process for producing high analysis granular ammonium phosphate sulfate and/or ammonium phosphate materials in relatively inexpensive equipment that can be installed inside of a conventional rotary TVA type ammoniator-granulator. The TVA ammoniator-granulator is described in U.S. Pat. No. 2,729,554, Nielsson. Nielsson also teaches a process for ammoniating superphosphate and is not concerned with the production of monoammonium phosphate, diammonium phosphate, or ammonium phosphate sulfate by the reaction of phosphoric acid, sulfuric acid, and ammonia. Nielsson's process gives good results when ammoniated superphosphate is the desired product, but it cannot be used for the production of granular diammonium phosphate, monoammonium phosphate, or ammonium phosphate sulfates in that direct introduction of ammoniating fluids and phosphoric acid into the rotating drum would result in the formation of a slurry, and not the formation of strong, granular ammonium phosphate and/or ammonium phosphate sulfate as taught by our invention.

We have overcome the difficulties inherent in apparatus and processes of the type described in the prior art to a substantial extent in our present invention by eliminating the steps of preneutralization and by providing an addition to the inclined drum shown in Nielsson, supra. The addition is a pipe-cross reactor which is installed inside the ammoniator-granulator. Anhydrous ammonia is vaporized and reacted with phosphoric acid and sulfuric acid or with only phosphoric acid in this pipe cross. In one variation of the process, liquid ammonia is mixed with a small quantity of water and the resulting hot aqua ammonia is fed to the pipe cross. In the diammonium phosphate process described by Achorn, supra, a preneutralization step is required and slurry from the preneutralizer must be pumped into the ammoniator-granulator. Since the slurry must be pumped, it cannot be of low moisture content because it is impossible to pump such a slurry containing less than 15 percent moisture at temperatures of 240°F and below.

Most slurries from preneutralizers using the Achorn process supra have a moisture content of about 20 percent. We have now found that by using our new invention (pipe cross and vaporization tube), it is possible to discharge the partially reacted sulfuric acid, phosphoric acid, and ammonia directly into the ammoniator-granulator. For this reason, discharge from our new pipe-cross reactor can be either anhydrous or of very low moisture which could not previously be pumped; therefore, less water would be introduced into the ammoniator-granulator. Our test results show that if the moisture introduction in the production of ammonium phosphate and ammonium phosphate sulfate can be minimized, higher production rates can be realized. Test results show that the production rate of the ammonium phosphate is directly proportional to the moisture content of the slurry from the preneutralizers or first ammoniation step. Since this reactor is installed inside the granulation equipment and will discharge directly onto the surface of the bed of granules in the ammoniator-granulator, it is possible to have little or no moisture in the partially neutralized slurry.

Several new and advantageous features of our process over conventional prior-art processes are realized in the present invention. Among these advantageous features are:

1. The equipment required for the practive of our invention is simple, economical, and very easy to operate.

2. The heat of chemical reaction is utilized to evaporate water from the phosphoric and sulfuric acids prior to introducing them to the bed of granular materials in the ammoniator-granulator. Efficient utilization of this chemical heat results in a recycle requirement that is significantly lower than in many other processes for the production of granular diammonium phosphate, monoammonium phosphate, or ammonium phosphate sulfate.

3. Other processes for the production of granular diammonium phosphate, monoammonium phosphate, and ammonium phosphate sulfate require fuel to dry the products from the ammoniator-granulator. Product from the ammoniator-granulator in our process is of low enough moisture and high enough temperature that it can be sufficiently dried during cooling so that a product will result of low enough moisture for satisfactory storage; therefore, our process eliminates the heretofore required drying equipment, whereas most of the processes in the prior art do require this type of equipment.

4. In our process, liquid ammonia can be used and chemical heat of the reaction is used to vaporize the ammonia, whereas in other processes for the production of granular diammonium phosphate, the ammonia must be vaporized in a first ammoniation step or used in a preneutralization vessel. Liquid ammonia can also be used in our process by first mixing it with a small quantity of water and then adding the resulting hot aqua ammonia to the reactor.

5. The spraying of hot slurry from our pipe-cross reactor into the granulator decreases the amount of dust lost from the granulator.

6. By pre-reacting some or all of the sulfuric acid in our pipe-cross reactor instead of reacting it in the bed of the granulator, the amount of ammonium chloride fumes (pollutant) formed in the granulator can be kept to a minimum.

Another advantage of the present invention is the elimination of equipment such as slurry meters, slurry pumps, and expensive transfer lines. Since our pipe-cross reactor discharges directly into the ammoniator-granulator this expensive equipment is not required.

In carrying out the objects of our invention in one form thereof, a rotating drum apparatus similar in design to that taught in Nielsson, supra, is used. We have found this drum granulation technique and equipment to be the most economical and best for continuous mixing, ammoniation, and granulation. In addition, we have discovered that if we can employ a pipe-cross reactor which is installed inside such an ammoniator-granulator and is used to partially neutralize the phosphoric acid and sulfuric acid with anhydrous ammonia (introduced to the reactor as liquid ammonia), a granular product having highly desirable physical and chemical characteristics may be withdrawn from the lower end of the drum.

This invention, together with further objects and advantages thereof, will be better understood from a consideration of the following description taken in connection with the accompanying drawings in which:

FIG. 1 is a flowsheet illustrating the principal novel process which results in an ammonium phosphate (either monoammonium or diammonium phosphate) or ammonium phosphate sulfate mixtures. In this flowsheet, the pipe-cross reactor is equipped to produce and use hot aqua ammonia. Liquid ammonia is fed to the process. This reactor can also be equipped to vaporize and use liquid ammonia.

Figure 2:
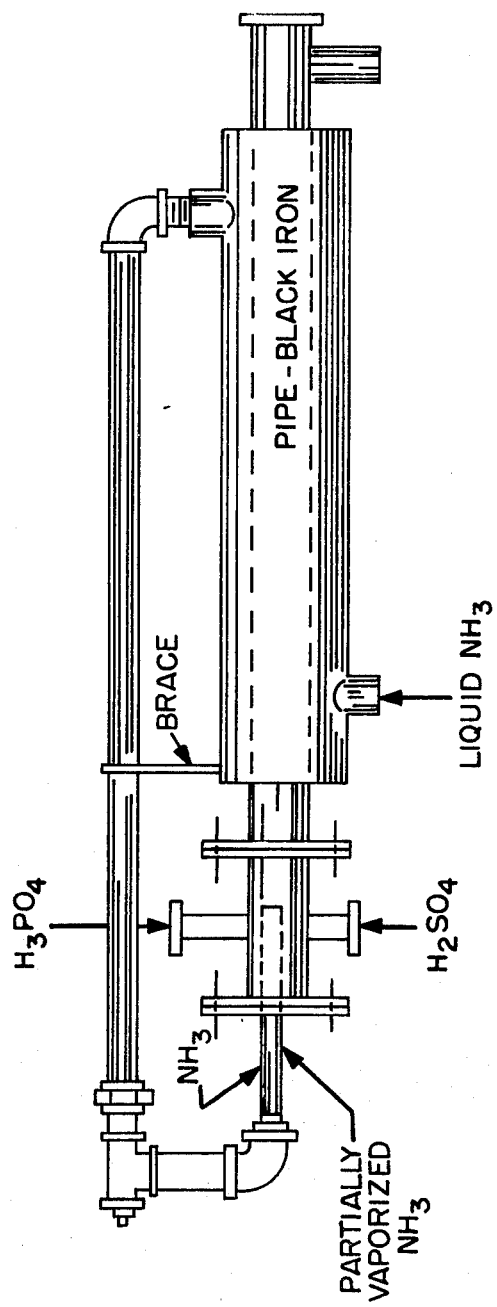

FIG. 2 is a sketch of our new pipe-cross reactor which shows the details for the vaporization of the anhydrous ammonia used in the process and the pipe-cross in which the phosphoric acid, sulfuric acid, and anhydrous ammonia are reacted.

Figure 3:
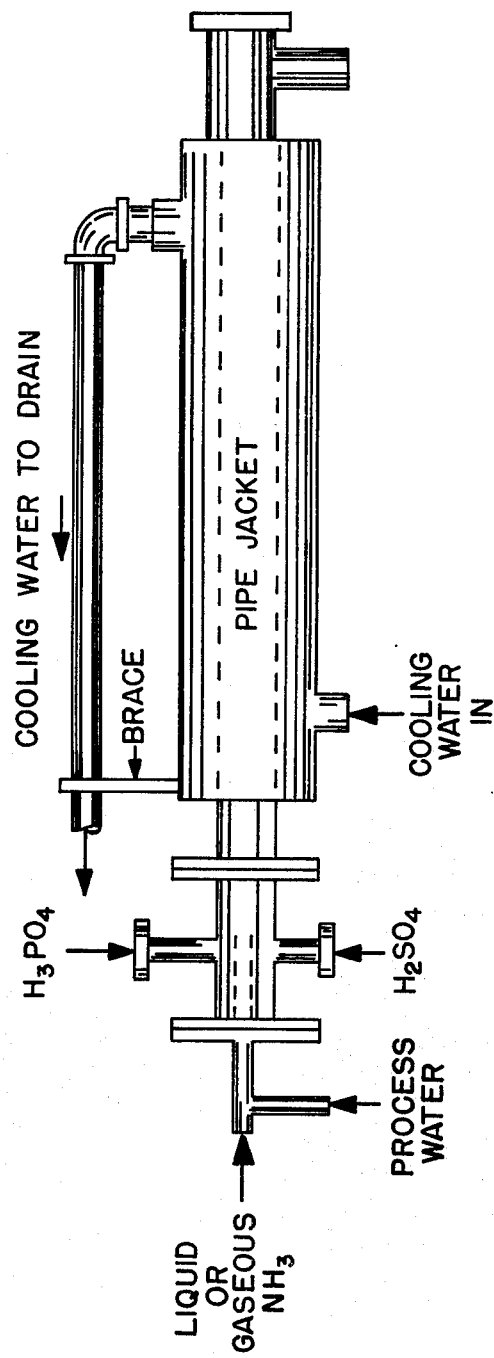

FIG. 3 shows a sketch of our pipe-cross reactor equipped to convert liquid ammonia to hot aqua and to use the hot aqua to react with the phosphoric acid and sulfuric acid of the process. Cooling water is added to the jacket around the 3-inch reaction tube of the reactor. This cooling water prevents corrosion of the stainless steel reaction tube.

FIG. 4 shows a sketch of a new design of our pipe-cross reactor. It uses a reaction tube that is made of Hastelloy C metal or Teflon-lined mild steel pipe. With this material of construction, the cooling jacket is not required to prevent corrosion of the 3-inch reaction tube.

Referring now more specifically to FIGS. 1 and 2, phosphoric and sulfuric acids from sources not shown are fed via lines 1 and 2, respectively, into pipe-cross section 3 of reactor 4. Liquid ammonia from a source not shown is fed via line 5 into vaporization section 6 of reactor 4 where the heat of neutralization of the acid causes vaporization of the ammonia. This vaporization is required to prevent violent vibration of the pipe cross. During startup, reduced flow rates of ammonia and acid are fed to reactor 4 for a very short period of time until the vaporization tube in vaporization section 6 becomes hot. With the vaporized ammonia, the pipe-cross reactor operates very smoothly with a minimum amount of vibration.

Referring now more specifically to FIGS. 1 and 3 in the alternate procedure, the liquid ammonia reacts with water to form hot aqua ammonia and this aqua reacts with phosphoric acid and sulfuric acid. Usually, part of the sulfuric acid and/or phosphoric acid used in the process are fed directly into ammoniator-granulator 7. Also, part of the liquid ammonia used in the process is fed to ammoniator-granulator 7. In ammoniator-granulator 7, the partially neutralized acids are further ammoniated so that the product contains ammonium sulfate and monoammonium phosphate or diammonium phosphate. Slurry from pipe-cross reactor 4 discharges as a spray from orifice 8; therefore, no slurry distributor is required in our process. The off-gases from ammoniator-granulator 7 are removed via line 9 to stack 10 by means of a large blower, not shown. This is desirable so that the steam released by pipe-cross reactor 4 can be removed from ammoniator-granulator 7 and a blower is used to remove this steam. It is important that this moisture be removed so that it will not cause overgranulation and high recycle rates in the process.

The granular ammonium phosphate or ammonium phosphate sulfate product material is withdrawn from the lower end of ammoniator-granulator 7 via line 11 and fed through a chute, not shown, into conventional rotary cooler 12 used to cool and dry the product. Other types of product coolers could be used, such as the fluid bed coolers now used in some granulation plants. Cooled and dried material is fed via line 13 through a chute, not shown, to screens 14 and crusher 15. Fines from screens 14 of predetermined size are fed via line 16, i.e., chute and conveyors, not shown, back to ammoniator-granulator 7. The granular ammonium phosphate or ammonium phosphate sulfate is withdrawn from the process via line 17 by conveyors and chutes, not shown.

In order that those skilled in the art might better understand how the present invention can be practiced, the following examples of methods and processes we have used with our pipe-cross reactor to produce the desired product enumerated supra, are given by way of illustration and not by way of limitation.

EXAMPLE I

In the first production plant tests of our process, the pipe-cross reactor was mounted in the ammoniator-granulator so that the discharge would be sprayed on top of the bed of rotating materials in the ammoniator-granulator. In other words, the discharge was pointed down and the point of discharge was near the center of the bed transversely and from end to end. Therefore, dry raw materials and liquid not fed to the pipe are mixing together slightly before the slurry or melt discharges from the pipe-cross reactor and strikes the bed of rotating materials in the ammoniator-granulator. The reactor was equipped to vaporize the ammonia used in the reactor (FIG. 2). The following formulation was used in the first test:

6-24-24

| Material | Lbs/Ton of Product |
|---|---|
| Anhydrous ammonia | 139 |
| Phosphoric acid (54% $P_2O_5$) | 608 |
| Triple superphosphate (46% $P_2O_5$) | 325 |
| Sulfuric acid | 139 |
| Muriate of potash (60.4% $K_2O$) | 809 |
| Filler | 92 |

In our first test of the pipe-cross reactor, all of the sulfuric acid and 37 percent of the phosphoric acid were fed to the pipe-cross reactor. The anhydrous ammonia to the pipe-cross was proportioned to ammoniate all of the sulfuric acid to ammonium sulfate and to ammoniate the phosphoric acid to an $NH_3:H_3PO_4$ mole ratio of 0.6. The production rate was 30 tons per hour. Operation of the pipe-cross reactor started very smoothly. The ammonia fed to the tee partially vaporized. Back pressure in the pipe-cross reactor began building up and was soon above 50 pounds per square inch, and flows of acid to the pipe-cross reactor were cut off by this back pressure, due to buildup of solid material in the pipe. We found the addition of a small quantity of water to the ammonia pipe helped to prevent the buildup and back pressure in the pipe-cross reactor. The plant operated well at the 30-ton-per-hour rate. The usual production rate for the 6-24-24 grade in this plant when the pipe-cross-type reactor is not used is 20 tons per hour.

The feed rates used in test 1 and the operating data obtained during this test is summarized in table I, infra.

This table shows the operating conditions for the pipe-cross reactor and the ammonia granulator during the production of the 6-24-24 granular ammonium phosphate sulfate.

Table I

| | |
|---|---|
| Date | 5/22/74 |
| Grade | 6-24-24 |
| Formula number | B-611 |
| Feed rates, lbs. per ton of product | |
| Pipe-cross | |
| Ammonia | 62 |
| Sulfuric acid (93% $H_2SO_4$) | 139 |
| Phosphoric acid (54% $P_2O_5$) | 222 |
| Water | 0 |
| Ammoniator-Granulator | |
| Ammonia | 88 |
| Phosphoric acid (54% $P_2O_5$) | 386 |
| Triple superphosphate | 325 |
| Sulfuric acid (93.2% $H_2SO_4$) | 0 |
| Potash (60% $K_2O$) | 809 |
| Filler | 92 |
| Production rate, tons per hour | 30 |
| Operating time, hours | 3 |
| Operating data | |
| Pipe-Cross | |
| Cooling water rate, lb/min (jacket) | 0 |
| Back pressure, psig | 25 |
| Ammoniator-Granulator | |
| Product temperature, °F | 205 |
| Product pH | 4.0 |
| Dryer product temperature, °F | 200 |
| product to storage temperature, °F | 110 |
| Product screen analysis, mesh (Tyler), % | |
| +6 | 4.1 |
| −6 +8 | 25.6 |
| −8 +12 | 40.1 |
| −12 +14 | 21.7 |
| −14 +16 | 6.0 |
| −16 +20 | 2.4 |
| −20 | 0.1 |
| Product chemical analysis, % | |
| N | 6.5 |
| $P_2O_5$ | 21.7 |
| $K_2O$ | 25.4 |
| $H_2O$ | 0.4 |

EXAMPLE II

The second test was started using the same formulation but feeding only 50 percent of the sulfuric acid to the pipe-cross reactor. Again we fed 37 percent of the phosphoric acid called for in the formulation to the pipe-cross reactor, and again the ammonia was regulated to ammoniate the sulfuric acid completely and the phosphoric acid to an $NH_3:H_3PO_4$ mole ratio of 1.0. No water was added to the ammonia pipe during this test. Operation under these conditions appeared to be very good. We operated for more than 3 hours and the back pressure did not exceed 25 pounds per square inch. The production rate was about 35 tons per hour.

EXAMPLE III

In the third test, a 12-12-12 ammonium phosphate sulfate mixture was produced with the pipe-cross reactor equipped to produce hot aqua ammonia and with cooling water used in the jacket around the reaction tube (FIG. 3). The formulation used in this test is tabulated below:

Formulation for 12-12-12 Ammonium Phosphate Sulfate Grade

| Material | Pounds Per Ton |
|---|---|
| Ammonia | 220 |
| Phosphoric acid (54% $P_2O_5$) | 464 |
| Sulfuric acid | 524 |
| Ammonium sulfate | 300 |
| Potash | 400 |

-continued
Formulation for 12-12-12 Ammonium
Phosphate Sulfate Grade

| Material | Pounds Per Ton |
|---|---|
| Filler | 215 |

In this test, 50 percent of the phosphoric acid and 70 percent sulfuric acid were fed to the pipe-cross reactor and the remaining requirements for these materials were fed to the ammoniator-granulator. About 64 percent of the ammonia was fed to the pipe-cross reactor ($NH_3:H_3PO_4$ mole ratio = 0.6) and the rest to the ammoniator-granulator. About 120 pounds of water per son of product was added to the pipe-cross reactor and about 100 gpm of cooling water was used in the cooling water jacket. The plant and reactor operated excellently at a production rate of 15 tons per hour. If the reactor were not used, it would be impossible to operate the plant at any rate due to too much liquid phase in the granulator. Over-granulation would occur because of the large quantity of acids (about 1000 pounds per ton) used in the formulation. Usually, plants of this type that do not have a pre-reactor are limited to using a total of 400 pounds of acids ($H_2SO_4 + H_3PO_4$) per ton of product.

An unexpected result in this test was that there was practically no plume from the plant stack. These plants usually have a heavy plume which contains a white aerosol of ammonium chloride which is considered to be a pollutant. The ammonium chloride must be removed with expensive and large Venturi scrubbers. The test results indicate that if the pipe-cross reactor is used, it will not be necessary to install this expensive equipment.

EXAMPLE IV

In a variation of this test, the proportion of the total ammonia added to the pipe-cross was increased so that the $NH_3:H_3PO_4$ mole ratio of slurry from the pipe-cross reactor was 1.0. Essentially the same overall formulation shown in Example III was used. With this change it was possible to increase the production rate to 27.3 tons per hour and when the pipe-cross reactor was not used with this formulation, the plant could not be operated because of over-granulation in the granulator. Also, chutes plugged and a product that was produced was too wet for storage. Data from previous plant tests in other plants show that if the plant were operated for a longer period with all of the acid used in the formulation being added to the granulator, the granules will turn into mud.

In this test the stainless steel reaction tube was replaced with a Hastelloy C tube and no cooling water jacket was used. During a part of the tests, the elbow-type orifice at the end of the reaction tube was replaced with a mild steel Teflon-lined elbow. No corrosion of the Hastelloy C or Teflonlined pipe occurred during the test.

Calculations show that 1.13 million Btu of chemical heat per square inch of pipe cross section was released in the pipe-cross reactor. Other calculations show that a total of 484,000 Btu of chemical heat per ton of product were released during the test. This is about 2.5 times the maximum that can be tolerated in the conventional plant if over-granulation is to be avoided.

The test results from examples III and IV show that a much higher production rate can be realized in the production of ammonium phosphate sulfate grades if the pipe-cross reactor is used instead of the more expensive and complicated preneutralizer or if all the acids and ammonia were added to the ammoniator-granulator. The tests show that the production rate can be increased by 25 to 50 percent by using the pipe-cross reactor.

The operating data and results for Example III are summarized in table II below. This tabulation shows the actual feed rates to the pipe-cross and ammoniator-granulator. Also shown are the actual operating results received during this test. Operating data include pipe-cross reactor jacket, cooling water rate, cooling water temperature, temperature of material from granulation, pH of the product, etc.

Table II

| Example | III | IV |
|---|---|---|
| Data | 7/11/74 | 2/15/74 |
| Grade | 12-12-12 | 12-12-12 |
| Formula number | B-1220 | B-1235 |
| Feed rates, lbs. per ton of product | | |
| Pipe-Cross | | |
|    Ammonia | 141 | 116 |
|    Sulfuric acid (93.2% $H_2SO_4$) | 369 | 256 |
|    Phosphoric acid (54% $P_2O_5$) | 232 | 275 |
|    Water | 120 | 39 |
| Ammoniator-Granulator | | |
|    Ammonia | 79 | 75 |
|    Ammonium sulfate (20% N) | 300 | 150 |
|    Phosphoric acid (54% $P_2O_5$) | 232 | 200 |
|    Sulfuric acid (93.2% $H_2SO_4$) | 155 | 150 |
|    Potash | 400 | 400 |
|    Filler | 215 | 174 |
|    Sodium nitrate | — | 200 |
| Production rate, tons per hour | 15 | 27.3 |
| Operating time, hours | 4 | 178 |
| Operating data | | |
| Pipe-Cross | | |
|    Cooling water, lb/min (jacket) | 101 | — |
|    Jacket inlet water temperature, °F | 92 | — |
|    Jacket outlet water temperature, °F | 125 | — |
|    Back pressure, psig | 33 | 40 |
| Ammoniator-Granulator | | |
|    Product temperature, °F | 236 | 240 |
|    Product pH | 3.2 | 4.0 |
| Dryer product temperature, °F | 209 | 210 |
| Product to storage temperature, °F | 120 | 130 |
| Product screen analysis, mesh (Tyler), % | | |

Table II-continued

| Example | III | IV |
|---|---|---|
| +6 | 0 | 0 |
| −6 +8 | 10.4 | 12.0 |
| −8 +12 | 29.6 | 30.0 |
| −12 +14 | 39.9 | 40.0 |
| −14 +16 | 10.1 | 12.0 |
| −16 +20 | 6.4 | 4.0 |
| −20 | 3.6 | 2.0 |
| Product chemical analysis, % | | |
| N | 11.3 | 12.1 |
| $P_2O_5$ | 12.6 | 12.2 |
| $K_2O$ | 11.8 | 12.3 |
| $H_2O$ | — | 0.5 |
| Chemical heat, Btu/sq.in. pipe cross section | $0.78 \times 10^6$ | $1.13 \times 10^6$ |
| Total chemical heat Btu/ton product | $569 \times 10^3$ | $484 \times 10^3$ |

Other tests indicate with this cross-type reactor it is possible to produce diammonium phosphate and/or monoammonium phosphate at high production rates. Plant data indicate that the production rates are higher when the pipe-cross-type reactor is used instead of a preneutralizer.

EXAMPLE V

In one short test, sulfuric acid to the pipe-cross reactor was shut off. The reactor was operated smoothly and a monoammonium phosphate grade (11–55–0) was produced. The test was not of sufficient duration to obtain detailed data. However, enough operating data was received to show that when 50 percent of the phosphoric acid required for the production of monoammonium phosphate was added to the pipe-cross reactor along with ammonia that was premixed with a small quantity of water, then the degree of ammoniation of the phosphoric acid was 0.2 pounds of nitrogen per pound of $P_2O_5$. The pipe-cross reactor operated very smoothly. The remaining requirement of phosphoric acid was dribbled above the bed of material in the ammoniator-granulator, and this acid and the slurry were ammoniated to monoammonium phosphate by adding additional ammonia through a perforated pipe-type sparger that was mounted within the bed of material in the ammoniator-granulator. The plant operated well with a reasonable recycle rate (estimated to be about 3 to 1).

This test was sufficient to show that either monoammonium phosphate or diammonium phosphate type grade could be produced using the pipe-cross reactor.

EXAMPLE VI

The test in Example V was of short duration; therefore a longer test was made to demonstrate the use of this process to produce granular monoammonium phosphate. However, it was desired to produce a fertilizer grade that had a $N:P_2O_5$ ratio of 1:4. This was accomplished by including a small quantity of sulfuric acid in the formulation so that the $P_2O_5$ of the grade would be in the form of monoammonium phosphate. The formulation shown in table III was used to produce the granular monoammonium phosphate 12–48–0 grade.

The average particle size of the recycle used in this test was unusually large. The average surface area of the particles used for recycle was calculated to be 6.53 mm, which is considerably larger than the normal average surface area of 1.78 mm (used in most granulation plants). Other tests show that the production rate is inversely proportional to the square root of ratio of the average particle size (diameter) of the recycle. Therefore, although a production rate of only 10 tons per hour was realized in the tests of Example VI, if a normal size recycle had been used, the production rate would have been about 37 tons per hour.

In the production of the monoammonium phosphate 12–48–0 grade no external heat source was required. Therefore, the dryer in the plant in which the tests were conducted was operated as a cooler. With this process considerable energy saving would be realized as compared with other monoammonium phosphate processes in which a pulverized monoammonium phosphate is produced, followed by steam granulation and drying using an external heat source, such as fuel oil.

In our process, drying is accomplished by the chemical heat of reaction between the ammonia and acids. The granular monoammonium phosphate produced by this process is spherical in shape, hard, dry, and free-flowing. It blends well with urea or ammonium nitrate and potash to produce dry mixes (bulk blends) with a wide range of $N:P_2O_5:K_2O$ ratios.

Table III

Production of Monoammonium Phosphate Using Pipe-Cross Reactor

| Test Number | 3 | |
|---|---|---|
| Formula Number | MAP-2 | |
| Grade | 12-48-0 | |
| Formulation, lbs. per ton product | | |
| Pipe-Cross Reactor | | |
| Ammonia | 201 | |
| Sulfuric acid (66°Be) | 204 | |
| Phosphoric acid (54% $P_2O_5$) | 921 | |
| Water | 25 | |
| Ammoniator-Granulator | | |
| Ammonia | 116 | |
| Phosphoric acid (54% $P_2O_5$) | 921 | |
| Sulfuric acid (66°Be) | — | |
| Triple superphosphate (46% $P_2O_5$) | — | |
| Diammonium phosphate (18% N, 45% $P_2O_5$) | — | |
| Potash (60% $K_2O$) | — | |
| Filler | — | |
| Scrubber liquor | — | |
| Duration of test, hr. | 4 | |
| Operating results | | |
| Production rate, tons per hr. | 10 | |
| Recycle ratio tons, recycle per ton product | 4.7*a* | |
| Granulator, product average pH | 4.2 | |
| Temperature, °F (average) | | |
| Material from granulator | 177 | |
| Material from dryer | 144 | |
| Dryer inlet gas | —*b* | |
| Dryer exit gas | 160 | |
| Product to storage | 85 | |
| Chemical heat | | |
| Released in pipe-cross reactor, $10^6$ Btu/in$^2$ | 0.59 | |
| Released in formulation $10^3$Btu/ton | 692.9 | |
| Total wt. acid in formulation, lbs/ton product | 2046 | |
| Product chemical analysis, % | | |
| N | 10.9 | 12.5 |
| $P_2O_5$ | 47.8 | 47.13 |

Table III-continued

Production of Monoammonium Phosphate Using Pipe-Cross Reactor

| | | |
|---|---|---|
| $K_2O$ | — | |
| $H_2O$ | 0.9 | 0.7 |
| Product screen analysis, % (Tyler screen) | | |
| +6 | 3.3 | |
| −6 +8 | 34.5 | |
| −8 +12 | 53.1 | |
| −12 +14 | 7.3 | |
| −14 +16 | 1.6 | |
| −16 +20 | 0.2 | |
| −20 | 0 | |
| Recycle screen analysis, % (Tyler screen) | | |
| +6 | 44.0 | |
| −6 +12 | 47.0 | |
| −12 +16 | 7.0 | |
| −16 | 2.0 | |
| Scrubber liquid flow rate, gpm[c] | 472 | |

[a]Calculated, by measuring volume of material on recycle belt.
[b]Burner off.
[c]Measured in wooden flume.

EXAMPLE VII

In another short test, a larger quantity of water was added to the ammonia used in the reactor, when the water rate was increased to one pound of water per pound of ammonia, and when the cooling water was added to the cooling water jacket the slurry temperature from the reactor was less than 240°F and there was no noticeable ammonia loss from the granulator when the $NH_3:H_3PO_4$ mole ratio of the slurry from the reactor was 1.4.

This data shows that this process can be used to produce granular diammonium phosphate 18–46–0 grade provided additional ammonia is added in the granulator. This is an improved process for the production of granular diammonium phosphate in that it does not require preneutralizers, slurry pumps, and slurry meters normally required in conventional diammonium phosphate process.

After sifting and winnowing through the data supra, as well as other results of tests and operation of our new, novel, and improved method of production for ammonium phosphates and ammonium phosphate sulfates, we now present the acceptable and preferred parameters and variables as shown below.

| | Operating Range | Preferred (about) |
|---|---|---|
| Strength of acid | | |
| Phosphoric, % $P_2O_5$ | 30–70 | 54 |
| Sulfuric, % $H_2SO_4$ | 77–98 | 78 |
| Feed rates, % of total feed | | |
| To pipe | | |
| Phosphoric acid | 50–≈100 | 40 |
| Sulfuric acid | 50–≈100 | 80 |
| Ammonia | 50–≈100 | 70 |
| To granulator | | |
| Phosphoric acid | 50–≈100 | 60 |
| Sulfuric acid | 50–≈100 | 20 |
| Ammonia | 50–≈100 | 30 |
| Pounds of $NH_3$/lb. of $H_2O$ to pipe cross | 1–10 | 3 |
| Ammoniation rates in pipe cross | | |
| For $H_3PO_4$, lbs. N/lb. $P_2O_5$ | 0.12–0.25 | 0.20 |
| For $H_2SO_4$, lbs. N/lb. 100% $H_2SO_4$ | 0.28–0.29 | 0.285 |
| Total ammoniation rates (to pipe cross and granulator) | | |
| For $H_3PO_4$, lbs. N/lb. $P_2O_5$ | 0.20–0.39 | 0.22 |
| For $H_2SO_4$, lbs. N/lb. 100% $H_2SO_4$ | 0.28–0.29 | 2.285 |
| Cooling water rate for pipe cross reactor jacket, lbs/min | 50–150 | 100 |
| Temperatures, °F | | |
| To pipe cross | | |
| Phosphoric acid | 30–250 | 70 |
| Sulfuric acid | 30–100 | 70 |
| Water | 35–200 | 70 |
| Cooling jacket water | | |
| Inlet | 30–125 | 70 |
| Outlet | 125–200 | 125 |
| Material from granulator | 160–240 | 200 |
| Material from cooler | 140–200 | 175 |
| Recycle rate, lbs. recycle/lb. of product | 1–4 | 2 |

If the above ammoniation rates for the pipe reactor are not kept within the operating range, excessive corrosion of the stainless steel pipe-cross reactor tube will occur or there will be an excessive loss of ammonia from the pipe cross. Corrosion of the Hastelloy C or Teflon lined pipe is no problem. The operating range for a minimum of corrosion to stainless steel (type 316L) and a minimum loss of ammonia is shown in the tabulation above.

The total ammoniation rates are also shown in this tabulation. When these ranges are exceeded, the recycle rate or ammonia loss from the plant will become excessive.

The tabulation also shows the quantity of water that is added with the ammonia to the pipe-cross reactor so that it will operate smoothly. In the various tests, varying amounts of water were added with the ammonia to the pipe cross so that the cross-type reactor would operate smoothly and not vibrate excessively. If the operating range is exceeded, as shown in the tabulation, the moisture of the slurry from the pipe cross will be too high for the production of the product without the use of an external heat source for drying. Or if the rate is not sufficient, the pipe-cross reactor will vibrate violently until it will rupture. The optimum water rate to the pipe-cross reactor was 3 pounds of ammonia per pound of water.

The temperature of the material from the cooler is about the same temperature as the material conveyed to storage. Higher range of 200°F occurred when the external heat source was added to the inlet gas to the cooler. When the preferred temperature was obtained, only cooling air was required and no external heat source was required by the process. This preferred material temperature from the cooler usually occurs when the other preferred rate and operating condition are used in the pipe-cross reactor.

Some Typical Grades of Product Produced

| Material | Grade |
| --- | --- |
| Ammonium phosphate sulfate | 15-15-15 |
| Ammonium phosphate sulfate | 6-24-24 |
| Monoammonium phosphate | 11-15-0 |
| Diammonium phosphate | 18-46-0 |
| Ammonium phosphate sulfate | 12-12-12 |
| Ammonium phosphate sulfate | 10-20-20 |
| Ammonium phosphate sulfate | 12-24-24 |
| Ammonium phosphate sulfate | 8-24-24 |
| Ammonium phosphate sulfate | 16-8-8 |
| Monoammonium phosphate | 12-48-0 |

The plant tests also indicate there is less inplant dust when the pipe-cross reactor is used to produce N:P:K mixtures. Also, there is less dust loss in the exit gas streams from the plant.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by letters patent of the United States is:

1. An improved process for preparing granular substantially dust free ammonium phosphate sulfates of a particle size distribution eminently suitable for subsequent bulk blending with other fertilizer values, which process comprises supplying a stream of aqueous medium to the common pipe section of a common pipe-cross-type reactor, said common pipe section being upstream from the later-mentioned cross section of said common pipe-cross-type reactor; simultaneously supplying a stream of anhydrous liquid ammonia to said common pipe section of said common pipe-cross-type reactor; supplying a stream of phosphoric acid to the cross section of said common pipe-cross-type reactor; simultaneously supplying a stream of sulfuric acid to said cross section of said common pipe-cross-type reactor, said streams of wet phosphoric acid and said sulfuric acid contacting the resulting mixture of said aqueous medium and said anhydrous liquid ammonia introdued into said common pipe section of said pipe-cross reactor at said cross section of said pipe-cross-type reactor; subsequently introducing the reaction product resulting from contacting said aqueous medium, anhydrous liquid ammonia, phosphoric acid, and sulfuric acid into a tubular extension of said common pipe-cross-type reactor to ensure continued intimate contact therebetween; subsequently discharging from about the end opposite the end of said tubular extension juxtaposed said common pipe-cross-type reactor a slurry of ammonium phosphate sulfate into the upper end of an inclined rotating drum; therein maintaining a bed of rolling discrete particles of ammonium phosphate sulfate; continuously introducing additional ammoniating fluid beneath the surface of said bed in a broad stream substantially countercurrent to the upward movement of said particles in such path, the breadth of said stream extending substantially the entire length of said bed; continuously introducing additional sulfuric acid beneath the surface of said bed in a broad stream countercurrent to the upward movement of said particles in such path, the breadth of said stream extending substantially the entire length of said bed; continuously introducing additional phosphoric acid above the surface of said bed in a broad stream substantially countercurrent to the movement of said particles in said path, the breadth of said stream extending substantially the entire length of said bed; withdrawing the resulting ammonium phosphate sulfate material from the lower end of said drum; introducing said withdrawn material into cooling means, withdrawing the resulting cooled material from said cooling means; introducing said material withdrawn from said cooling means into sizing means; returning particles of predetermined size from said sizing means into the upper end of said drum and withdrawing from said sizing means granular particles of ammonium phosphate sulfate as product, said process characterized by the fact that there is substantially no change in the moisture content of said ammonium phosphate sulfate between said step of removing same from the lower end of said drum to the recovery of same as product.

2. The process of claim 1 for the production of granular monoammonium phosphate wherein the stream of sulfuric acid is limited to relatively small quantity ranging from about 25 to 204 pounds per ton of product, wherein the mole ratio $NH_3:H_3PO_4$ of the slurry in the pipe-cross reactor is maintained at about 0.6 to about 1.5, and wherein the mole ratio $NH_3:H_3PO_4$ of the material comprising the bed of particles in said drum is maintained at about 1.0.

3. The process of claim 1 wherein the ratio of pounds of $NH_3$/pounds $H_2O$ introduced into said common pipe section ranges from about 1.5 to about 10.

4. The process of claim 3 wherein the ammoniation rates in said common pipe-cross-type reactor range for $H_3PO_4$, pounds N/pound of $P_2O_5$ about 0.12 to 0.25 and for $H_2SO_4$, pounds N/pound 100 percent $H_2SO_4$ about 0.28 to about 0.29.

5. The process of claim 3 wherein the total ammoniation rate for said acids fed to both said common pipe-cross-type reactor and said granulator range for $H_3PO_4$, pounds N/pound $P_2O_5$ from about 0.20 to about 0.39, and for $H_2SO_4$, pounds N/pound 100 percent $H_2SO_4$ from about 0.28 to about 0.29.

6. The process of claim 3 wherein the ratio of pounds of ammonia to pounds of water fed to said common pipe section is about 5.

7. The process of claim 6 wherein the ammoniation rate in said common pipe-cross-type reactor for $H_3PO_4$, pounds N/pound $P_2O_5$ is about 0.20, and for $H_2SO_4$, pounds N/pound 100 percent $H_2SO_4$ is about 0.285.

8. The process of claim 7 wherein the total ammoniation rate for said acids fed to both said common pipe-cross-type reactor and said granulator for $H_3PO_4$, pounds N/pound $P_2O_5$ is about 0.22, and for $H_2SO_4$, pounds N/pound 100 percent $H_2SO_4$ is about 0.285.

9. The process of claim 5 wherein the approximate feed rate percentage by weight of total feed of the said acids and ammonia is about as follows:

| | To common pipe-cross-type reactor | To granulator |
| --- | --- | --- |
| Phosphoric acid | 50 | 50 |
| Sulfuric acid | 80 | 20 |
| Ammonia | 70 | 30. |

10. The process of claim 9 wherein the material withdrawn from said cooler is withdrawn at temperatures ranging from about 140°F to about 200°F.

11. The process of claim 10 wherein the material withdrawn from said cooler is at a temperature of about 175°F.

* * * * *